(12) United States Patent
Miki

(10) Patent No.: US 11,298,834 B2
(45) Date of Patent: Apr. 12, 2022

(54) END EFFECTOR DEVICE, ROBOTIC HAND DEVICE, AND ROBOTIC DEVICE

(71) Applicant: KYOCERA Document Solutions Inc., Osaka (JP)

(72) Inventor: Masafumi Miki, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 243 days.

(21) Appl. No.: 16/832,045

(22) Filed: Mar. 27, 2020

(65) Prior Publication Data

US 2020/0324421 A1 Oct. 15, 2020

(30) Foreign Application Priority Data

Apr. 15, 2019 (JP) .............................. JP2019-077114

(51) Int. Cl.
| | |
|---|---|
| B25J 19/00 | (2006.01) |
| B65H 75/48 | (2006.01) |
| B65H 75/44 | (2006.01) |
| B25J 15/04 | (2006.01) |
| H02G 11/02 | (2006.01) |

(52) U.S. Cl.
CPC ....... *B25J 19/0025* (2013.01); *B25J 15/0433* (2013.01); *B65H 75/4402* (2013.01); *B65H 75/486* (2013.01); *H02G 11/02* (2013.01)

(58) Field of Classification Search
CPC .............. B25J 19/0025; B25J 15/0433; B64H 75/4402; B64H 75/486; H02G 11/02
See application file for complete search history.

(56) References Cited

U.S. PATENT DOCUMENTS

| | | | | |
|---|---|---|---|---|
| 4,499,341 A | * | 2/1985 | Boyd ................. | B65H 75/4449 191/12.4 |
| 5,647,554 A | * | 7/1997 | Ikegami ............. | B65H 75/4486 242/390.9 |
| 7,559,590 B1 | * | 7/2009 | Jones ................... | B25J 19/0025 294/2 |
| 10,989,282 B1 | * | 4/2021 | Hoffman ............. | F16H 19/0672 |
| 2010/0294897 A1 | * | 11/2010 | Georgey .............. | B65H 75/486 248/75 |
| 2011/0072931 A1 | * | 3/2011 | Gro ........................ | H02G 11/02 74/490.02 |
| 2011/0163490 A1 | * | 7/2011 | Nagai .................... | H02G 11/02 269/57 |
| 2015/0128748 A1 | * | 5/2015 | Rueb .................... | B25J 19/0041 74/490.02 |
| 2016/0311120 A1 | * | 10/2016 | Goto .................... | B25J 19/0029 |
| 2020/0246984 A1 | * | 8/2020 | Lin .......................... | B25J 9/044 |

FOREIGN PATENT DOCUMENTS

JP 2004090135 A 3/2004

* cited by examiner

*Primary Examiner* — William Kelleher
*Assistant Examiner* — Gregory T Prather
(74) *Attorney, Agent, or Firm* — Studebaker & Brackett PC

(57) ABSTRACT

An end effector device includes a housing, a cable, and a winding mechanism. The cable includes at least one of lines that include a power supply line and a signal line. The winding mechanism is located inside the housing and configured to wind the cable. The winding mechanism includes a case, a reel, and a spiral spring. The reel is supported in the case and allowed to rotate and wind the cable. The spiral spring urges the reel in a retrieval direction of the cable pulled out of the reel.

8 Claims, 5 Drawing Sheets

US 11,298,834 B2

END EFFECTOR DEVICE, ROBOTIC HAND DEVICE, AND ROBOTIC DEVICE

INCORPORATION BY REFERENCE

The present application claims priority under 35 U.S.C. § 119 to Japanese Patent Application No. 2019-077114, filed on Apr. 15, 2019. The contents of this application are incorporated herein by reference in their entirety.

BACKGROUND

The present disclosure relates to an end effector device, a robotic hand device, and a robotic device.

There is a known robotic device equipped with an end effector device and a robotic hand device that drives the end effector device. The end effector device is replaceable and connected to a distal end of the robotic hand device.

A robotic hand device includes a first arm and a second arm. The first arm includes an output shaft. The output shaft is driven by a motor, thereby rotating. The second arm is coupled to the output shaft of the first arm. An electric connection cable is arranged to pass through a joint between the first arm and the second arm. The cable includes a winding that is loosely wound around the output shaft. The winding is constituted by a flexible flat cable. The winding is tightly wound and loosely wound, thereby securing a constant rotation range of the second arm relative to the first arm.

SUMMARY

An end effector device according to an aspect of the present disclosure includes a housing, a cable, and a winding mechanism. The cable includes at least one of lines that include a power supply line and a signal line. The winding mechanism is located inside the housing and winds the cable. The winding mechanism includes a case, a reel, and a spiral spring. The reel is supported in the case and allowed to rotate and wind the cable. The spiral spring urges the reel in a retrieval direction of the cable pulled out of the reel.

A first robotic device according to an aspect of the present disclosure includes the end effector device and a robotic hand device that drives the end effector device.

A robotic hand device according to an aspect of the present disclosure includes a housing, a cable, and a winding mechanism. The cable includes at least one of lines that include a power supply line and a signal line. The winding mechanism is located inside the housing and winds the cable. The winding mechanism includes a case, a reel, and a spiral spring. The reel is supported in the case and allowed to rotate and wind the cable. The spiral spring urges the reel in a retrieval direction of the cable pulled out of the reel.

A second robotic device according to an aspect of the present disclosure includes the robotic hand device.

DETAILED DESCRIPTION

First Embodiment

Figure 1:
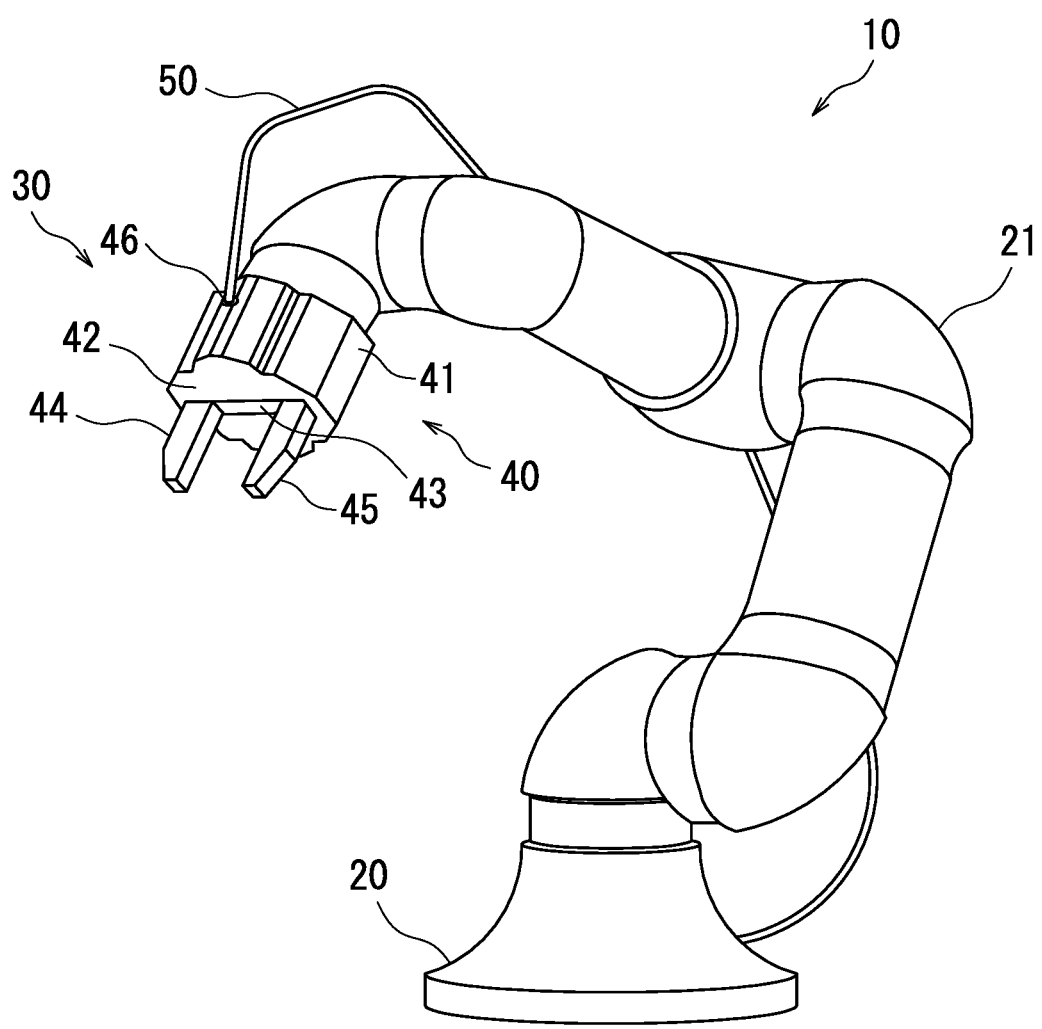
FIG. 1 is a perspective view of a robotic device according to a first embodiment of the present disclosure.

A first embodiment of the present disclosure will hereinafter be described with reference to FIGS. 1 to 5. Elements that are the same or equivalent are labelled with the same reference signs in the drawings and description thereof is not repeated.

A robotic device 10 according to the first embodiment will first be described with reference to FIG. 1. FIG. 1 is a perspective view of the robotic device 10 according to the first embodiment.

As illustrated in FIG. 1, the robotic device 10 includes a base 20, a robotic hand device 21, and an end effector device 30.

The robotic hand device 21 is located on the base 20. The robotic hand device 21 includes arms coupled to each other through multi-axis joints and drives the end effector device 30. The end effector device 30 is replaceable and connected to a distal end of the robotic hand device 21. Here, the distal end is equivalent to a wrist.

The end effector device 30 includes a housing 40, a first finger 44, a second finger 45, and a cable 50.

The housing 40 is shaped into a substantial cylinder having a center axis. The housing 40 has a peripheral side surface 41 and a bottom surface 42. An opening 46 is formed in the peripheral side surface 41. One end of the cable 50 is pulled out of the opening 46 toward the outside of the housing 40. An opening 43 is formed in the bottom surface 42. The opening 43 is rectangular in shape and forms one guide path.

Each of the first and second fingers 44 and 45 protrudes from the opening 43. The first and second fingers 44 and 45 are located substantially symmetrically in the guide path formed by the opening 43 with the center axis of the housing 40 interposed therebetween. This allows the first and second fingers 44 and 45 to perform linear motion. This enables the first and second fingers 44 and 45 to increase or decrease distance therebetween. The first and second fingers 44 and 45 constitute a holding section for holding a work. The housing 40 accommodates built-in components such as an unillustrated motor and an unillustrated drive mechanism. The drive mechanism includes for example a rack and a pinion for converting a rotational motion of the motor into a linear motion. The first and second fingers 44 and 45 are driven by the drive mechanism.

The cable 50 includes at least one of lines that include a power supply line and a signal line. The one end of the cable 50 pulled out of the opening 46 extends to the base 20.

Figure 2:
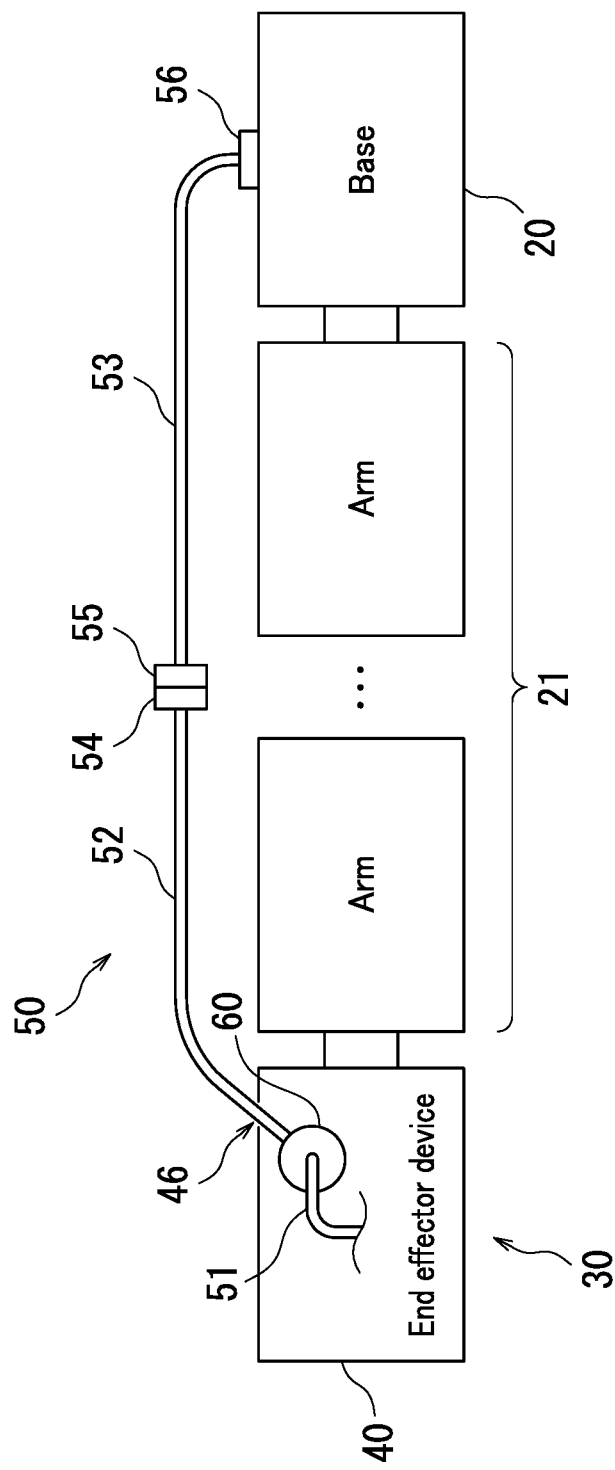
FIG. 2 is a schematic internal configuration block diagram of an end effector device.

An internal configuration of the end effector device 30 will next be described with reference to FIGS. 1 and 2. FIG. 2 is a schematic internal configuration block diagram of the end effector device 30.

As illustrated in FIG. 2, the end effector device 30 further includes a winding mechanism 60. The winding mechanism 60 is located inside the housing 40 and winds the cable 50.

The cable 50 includes a fixed length part 51, a pulled-out part 52, and an extension part 53. The fixed length part 51 extends from a center part of the winding mechanism 60. A leading edge of the fixed length part 51 is connected to an electric device such as an unillustrated motor inside the housing 40. The pulled-out part 52 extends from a peripheral part of the winding mechanism 60. A leading edge of the pulled-out part 52 is connected with a first connector 54. One end of the extension part 53 is connected with a second connector 55. The pulled-out part 52 is connected to the extension part 53 through the first and second connectors 54 and 55. The other end of the extension part 53 is connected to the base 20 through a third connector 56. The end effector device 30 receives power supplied from an unillustrated power supply provided in the base 20 through the cable 50.

Figure 3:
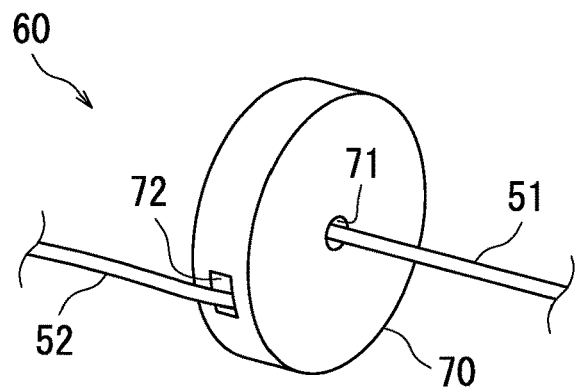
FIG. 3 is a perspective view of a winding mechanism.
Figure 4:
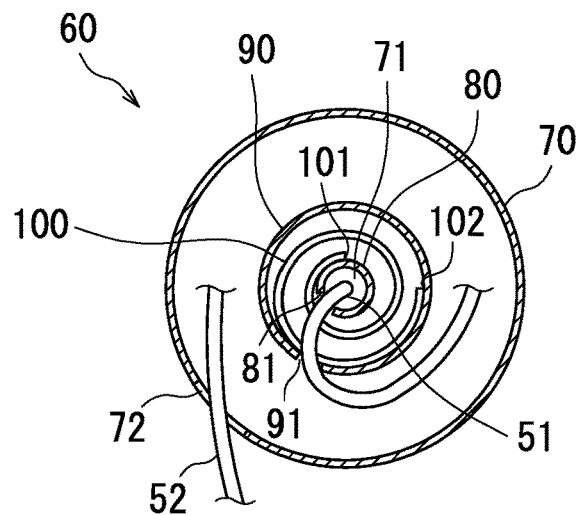
FIG. 4 is a cross-sectional view of the winding mechanism that is cut in a plane intersecting with a center line thereof.

A detailed configuration of the winding mechanism 60 will next be described with reference to FIGS. 2, 3, and 4. FIG. 3 is a perspective view of the winding mechanism 60. FIG. 4 is a cross-sectional view of the winding mechanism 60 that is cut in a plane intersecting with a center line thereof.

As illustrated in FIGS. 3 and 4, the winding mechanism 60 includes a case 70, a hollow spindle 80, a reel 90, and a spiral spring 100.

The case 70 has a hollow cylindrical shape. A central opening 71 that is circular in shape is formed in a center part of the case 70, and an outlet 72 that is rectangular in shape is formed in a peripheral part of the case 70. The fixed length part 51 extends from the central opening 71, while the pulled-out part 52 extends from the outlet 72.

On the periphery of the central opening 71, the hollow spindle 80 is fixed to the case 70 with the hollow spindle 80 concentric with the case 70. The hollow spindle 80 includes a cut 81 that allows the fixed length part 51 to pass therethrough.

The reel 90 includes a disk having a center hole, and a wall raised from a periphery of the disk. The center hole allows the hollow spindle 80 to be inserted thereinto. Thus, the reel 90 is supported in the case 70 and allowed to rotate and wind the pulled-out part 52. The reel 90 has a cut 91 in the wall thereof. The cut 91 allows the fixed length part 51 to pass therethrough.

The spiral spring 100 urges the reel 90 in a retrieval (rewinding) direction of the pulled-out part 52. Accordingly, a proximal end 101 of the spiral spring 100 is fixed to an outer surface of the hollow spindle 80, and a distal end 102 of the spiral spring 100 is fixed to an inner surface of the hollow spindle 80. When the pulled-out part 52 is pulled out of the outlet 72, the reel 90 rotates. As the reel 90 rotates, the spiral spring 100 is tightly wound. As a result, the spiral spring 100 applies torque to the reel 90 in a retrieval direction of the pulled-out part 52.

Figure 5:
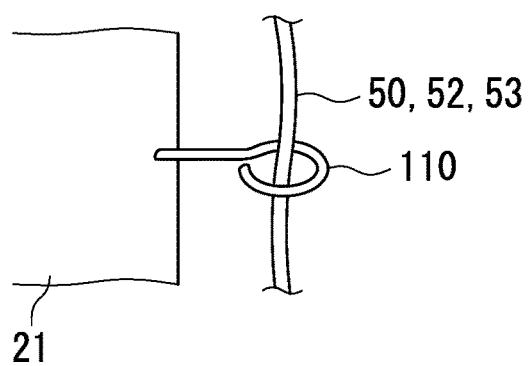
FIG. 5 is a perspective view of a guide section for guiding a cable.

A guide section 110 for guiding the cable 50 will next be described with reference to FIGS. 1, 2, and 5. FIG. 5 is a perspective view of the guide section 110 for guiding the cable 50.

As illustrated in FIG. 5, the robotic hand device 21 includes the guide section 110 for guiding the cable 50. The guide section 110 has for example a ring that allows the cable 50 to pass therethrough. Here, the cable 50 means the pulled-out part 52 or the extension part 53.

The first embodiment employs the winding mechanism 60 that winds the cable 50 using the spiral spring 100, thereby providing the end effector device 30 equipped with the cable 50 having pseudo-elasticity as if it were elasticity of a rubber string. The embodiment consequently decreases the possibility that foreign matter will get entangled in the cable 50. The embodiment prevents disconnection of the cable 50 due to bending thereof even when the end effector device 30 has been driven so as to rotate multiple times relative to the distal end of the robotic hand device 21.

Note that due to limitation of an internal volume of the case 70, the cable 50 has a first portion that allows to be wound on the reel 90 and a second portion that does not allow to be wound on the reel 90. As illustrated in FIG. 2, the second portion includes a first section including part of the pulled-out part 52 and the first connector 54, and a second section including the extension part 53, the second connector 55, and the third connector 56. The first section is connected to the second section through the first and second connectors 54 and 55.

Second Embodiment

A second embodiment of the present disclosure will hereinafter be described with reference to FIGS. 6 and 7. Elements that are the same or equivalent are labelled with the same reference signs in the drawings and description thereof is not repeated.

A robotic device 10 according to the second embodiment will first be described with reference to FIG. 6. FIG. 6 is a perspective view of the robotic device 10 according to the second embodiment.

Figure 6:
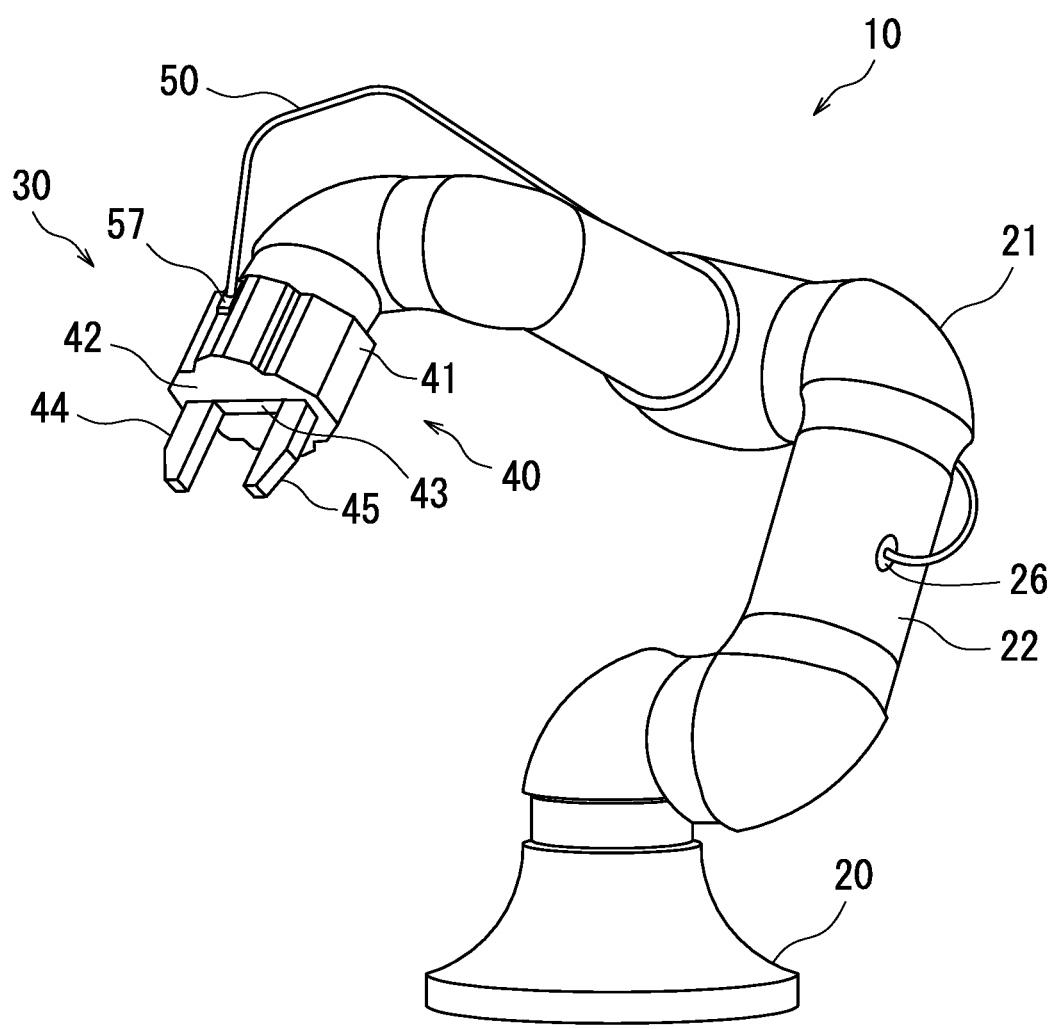
FIG. 6 is a perspective view of a robotic device according to a second embodiment of the present disclosure.

As illustrated in FIG. 6, the robotic device 10 according to the second embodiment differs from the robotic device 10 according to the first embodiment in that one end of a cable 50 is pulled out of an opening 26 provided in a side part of a housing 22 of one arm toward the outside of the housing 22. The arm is part of components of a robotic hand device 21. A leading edge of the cable 50 is connected to an end effector device 30 through a fourth connector 57. The cable 50 includes at least one of lines that include a power supply line and a signal line.

An internal configuration of the robotic hand device 21 will next be described with reference to FIGS. 6 and 7. FIG. 7 is a schematic internal configuration block diagram of the robotic hand device 21.

Figure 7:
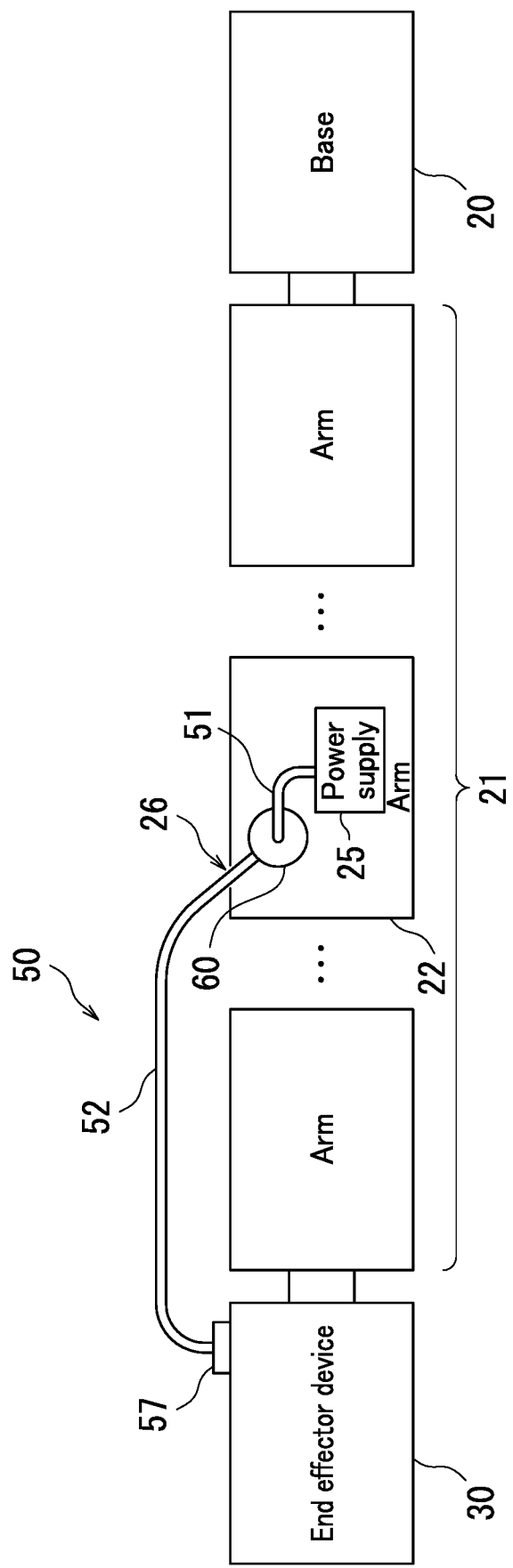
FIG. 7 is a schematic internal configuration block diagram of a robotic hand device.

As illustrated in FIG. 7, the above-described one arm that is part of the components of the robotic hand device 21 includes a power supply 25 and a winding mechanism 60. The winding mechanism 60 is located inside the housing 22 and winds the cable 50.

The cable 50 includes a fixed length part 51 and a pulled-out part 52. The fixed length part 51 extends from a center part of the winding mechanism 60. A leading edge of the fixed length part 51 is connected to the power supply 25. The pulled-out part 52 extends from a peripheral part of the winding mechanism 60. A leading edge of the pulled-out part 52 is connected to the end effector device 30 through the fourth connector 57. The end effector device 30 receives power supplied from the power supply 25 provided inside the robotic hand device 21 through the cable 50.

A detailed configuration of the winding mechanism 60 illustrated in FIG. 7 is the same as the configuration described with reference to FIGS. 2 to 4.

The second embodiment employs the winding mechanism 60 that winds the cable 50 using a spiral spring 100, thereby providing the robotic hand device 21 equipped with the cable 50 having pseudo-elasticity as if it were elasticity of a rubber string. The embodiment consequently decreases the possibility that foreign matter will get entangled in the cable 50. The embodiment prevents disconnection of the cable 50 due to bending thereof even when the end effector device 30 has been driven so as to rotate multiple times relative to a distal end of the robotic hand device 21.

In the above description of the embodiments described above, various technically preferable limitations may be given to illustrate preferred embodiments in the present disclosure. However, the technical scope of the present disclosure is not limited to the embodiments unless otherwise specified by description limiting the present disclosure. That is, the elements of configuration in the above-described embodiments can be appropriately replaced with existing constituent elements or the like, and various variations including combinations with other existing constituent elements are possible. The description of the embodiments should not be construed as limitations on the contents of the disclosure described in the scope of claims.

For example, although the pulled-out part 52 of the cable 50 is pulled out of the opening 46 of the end effector device 30 toward the outside of the housing 40 as illustrated in FIG. 2 in the first embodiment, the present disclosure is not limited to this. In addition, although the pulled-out part 52 of the cable 50 is pulled out of the opening 26 of the robotic hand device 21 toward the outside of the housing 22 as illustrated in FIG. 7 in the second embodiment, the present disclosure is not limited to this. The pulled-out part 52 of the cable 50 may pass through a joint between the robotic hand device 21 and the end effector device 30. Alternatively, the pulled-out part 52 of the cable 50 may pass through a joint between arms of the robotic hand device 21.

Although the end effector device 30 includes the first and second fingers 44 and 45 in order to hold a work as illustrated in FIGS. 1 and 6, the present disclosure is not limited to this. For example, the end effector device 30 may include a suction opening for sucking a work.

Although the winding mechanism 60 includes a section accommodating the cable 50 and a section accommodating the spiral spring 100 that are partitioned by the wall of the reel 90 as illustrated in FIG. 4 in the first and second embodiments, the present disclosure is not limited to this. The cable 50 may be configured to be accommodated in a section that is the same as a section accommodating the spiral spring 100.

What is claimed is:

1. An end effector device comprising:
a housing;
a cable including at least one of lines that include a power supply line and a signal line; and
a winding mechanism that is located inside the housing and configured to wind the cable, wherein
the winding mechanism includes:
a case;
a reel that is supported in the case and allowed to rotate and wind the cable; and
a spiral spring that urges the reel in a retrieval direction of the cable pulled out of the reel.

2. The end effector device according to claim 1, wherein one end of the cable is pulled out of an opening provided in a side part of the housing toward an outside of the housing.

3. The end effector device according to claim 1, wherein the cable includes:
a first portion that allows to be wound on the reel; and
a second portion that does not allow to be wound on the reel, and
the second portion includes sections that are connected to each other through connectors.

4. A robotic device comprising:
the end effector device according to claim 1; and
a robotic hand device configured to drive the end effector device.

5. The robotic device according to claim 4, wherein the robotic hand device includes a guide section for guiding the cable.

6. A robotic hand device comprising:
a housing;
a cable including at least one of lines that include a power supply line and a signal line; and
a winding mechanism that is located inside the housing and configured to wind the cable, wherein
the winding mechanism includes:
a case;
a reel that is supported in the case and allowed to rotate and wind the cable; and
a spiral spring that urges the reel in a retrieval direction of the cable pulled out of the reel.

7. The robotic hand device according to claim 6, wherein one end of the cable is pulled out of an opening provided in a side part of the housing toward an outside of the housing.

8. A robotic device, comprising
the robotic hand device according to claim 6.

* * * * *